United States Patent
Chitayat et al.

(10) Patent No.: US 7,218,017 B1
(45) Date of Patent: May 15, 2007

(54) SYSTEM AND METHOD TO CONTROL A ROTARY-LINEAR ACTUATOR

(75) Inventors: Anwar Chitayat, Fort Salanga, NY (US); Mustanzir Faizullabhoy, Stony Brook, NY (US)

(73) Assignee: Anorad Corporation, Shirley, NY (US)

( * ) Notice: Subject to any disclaimer, the term of this patent is extended or adjusted under 35 U.S.C. 154(b) by 519 days.

(21) Appl. No.: 09/817,622

(22) Filed: Mar. 26, 2001

Related U.S. Application Data

(63) Continuation-in-part of application No. 09/415,562, filed on Oct. 8, 1999, now Pat. No. 6,215,206, which is a continuation of application No. 08/668,705, filed on Jun. 24, 1996, now Pat. No. 6,137,195.

(51) Int. Cl.
*H02K 41/00* (2006.01)
*H02K 33/12* (2006.01)
*F16C 39/06* (2006.01)

(52) U.S. Cl. ............... 310/12; 310/15; 310/156.25; 310/156.38; 310/254; 310/68 B; 417/415

(58) Field of Classification Search ............... 318/135; 700/56; 310/12, 15
See application file for complete search history.

(56) References Cited

U.S. PATENT DOCUMENTS

| | | | |
|---|---|---|---|
| 2,722,617 A | 11/1955 | Cluwen et al. | |
| 3,441,819 A | 4/1969 | Palmero | |
| 3,777,292 A | 12/1973 | Fulenwider | |
| 3,851,196 A | 11/1974 | Hinds | |
| 4,234,831 A | 11/1980 | Kemmer et al. | |
| 4,626,749 A | 12/1986 | Asakawa | |
| 4,644,205 A | 2/1987 | Sudo et al. | |
| 4,692,678 A * | 9/1987 | Lee | 318/687 |
| 4,720,650 A | 1/1988 | Hanamori et al. | |
| 4,742,286 A | 5/1988 | Phillips | |
| 4,751,437 A * | 6/1988 | Gerard | 310/13 |
| 4,808,955 A | 2/1989 | Godkin et al. | |
| 4,965,864 A * | 10/1990 | Roth et al. | 318/135 |
| 5,081,388 A | 1/1992 | Chen | |
| 5,142,172 A | 8/1992 | Horikoshi et al. | |
| 5,532,533 A * | 7/1996 | Mizutani | 310/68 B |
| 5,747,952 A * | 5/1998 | Izawa et al. | 318/135 |
| 5,771,174 A * | 6/1998 | Spinner et al. | 700/127 |
| 5,774,355 A * | 6/1998 | Mizuno et al. | 700/23 |
| 5,777,402 A * | 7/1998 | Chitayat | 310/12 |

* cited by examiner

*Primary Examiner*—Burton Mullins
(74) *Attorney, Agent, or Firm*—Amin Turocy & Calvin LLP; Alexander R. Kuszewski

(57) ABSTRACT

A system and method are disclosed for controlling an integrated rotary-linear actuator system that may be coupled to a network via a network interface. The integrated rotary-linear actuator system includes a control system and a rotary-linear actuator having a moveable plunger and associated coils. The coils may be energized to interact with associated magnets to effect corresponding movement of the plunger, which may include rotation and/or linear movement. The network interface facilitates receipt of control information at the control system of the integrated rotary-linear actuator system from the network. The control system may control an amplifier to energize the coils based on the control information.

24 Claims, 16 Drawing Sheets

US 7,218,017 B1

SYSTEM AND METHOD TO CONTROL A ROTARY-LINEAR ACTUATOR

RELATED APPLICATION

The present application is a continuation-in-part of application Ser. No. 09/415,562, filed Oct. 8, 1999, now U.S. Pat. No. 6,215,206 and entitled ROTARY-LINEAR ACTUATOR, which is a continuation of application Ser. No. 08/668,705, which was filed Jun. 24, 1996 now U.S. Pat. No. 6,137,195, and entitled ROTARY-LINEAR ACTUATOR, now U.S. Pat. No. 6,137,195.

TECHNICAL FIELD

The present invention relates to motors and, more particularly, to a system and method to control a rotary-linear actuator.

BACKGROUND OF THE INVENTION

Various kinds of robotic actuators are known that provide multiple degrees of freedom. There is a need in the field for actuators that provide high accuracy, low weight, large load-carrying capacity, compact size, smooth operation, and cost-effectiveness. One known type of actuator that provides two-degrees of freedom, which scores highly in terms of the above design goals, is an entire class of so-called X-Y traversing systems, for example, as described in U.S. Pat. No. 5,334,892, the entirety of which is incorporated herein by reference. This patent describes a traversing system with a movable stage supported on an air bearing above a planar base. The traversing system described in the patent is, however, limited to movement in a plane.

Additionally, such systems often employ voluminous wiring harnesses having numerous conductors to communicate control information and provide power between individual parts of the motor system. While the harnesses provide an effective means of communication and power, they tend to add significantly to the manufacturing cost of the system.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method to control a rotary-linear actuator. According to one aspect, an integrated rotary-linear actuator system is provided that includes a control system and an associated rotary-linear motor, which may be integrated into a single module. The motor includes a moveable plunger and associated coils. When the coils are energized, they interact with magnets to effect corresponding movement of the plunger, which may include rotation and/or linear movement. The control system includes a network interface to enable control information to be received at the integrated rotary-linear actuator system over an associated network. By way of example, the control information may be employed to program the control system to enable desired operating characteristics of the rotary-linear motor. The control system, in turn, controls an amplifier to energize the coils based on the control information.

Another aspect of the present invention provides a method for controlling an integrated rotary-linear actuator system, which includes a network interface to enable communication over an associated network. The method includes receiving control information from the network at the network interface of the integrated rotary-linear actuator system and programming operating parameters of the rotary-linear actuator system. An amplifier is controlled to selectively energize coils of the rotary-linear actuator system according to the programmed operating parameters, so as to move a plunger accordingly.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 6A:
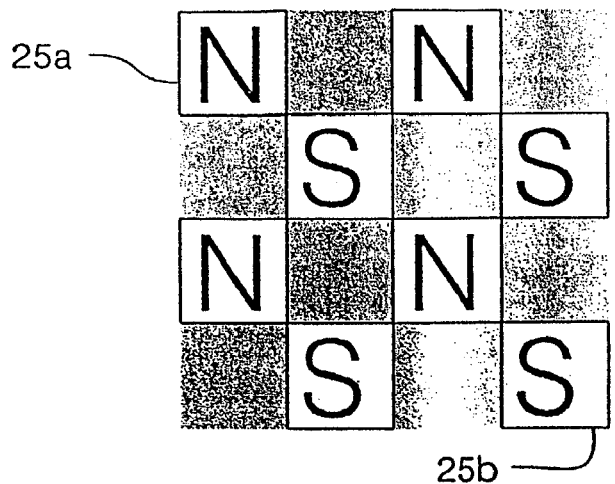
FIG. 6a shows a planar projection of the magnet array attached to the plunger element or a base according to one embodiment of this feature of the invention.

Referring to FIGS. 1a, 1b, 6a–6c, and 7a, in an embodiment of the invention, a cylindrical plunger element 26 floats on an air bearing 76 in a well formed by a motor support 27 and an air bearing support 28. A surface defining the well has a groove 16 through which air is distributed to form air bearing 76. Appropriate orifices and pockets (not shown) are supplied as required according to known techniques for making air bearings. Plunger element 26 is free to move axially and rotate about its axis supported on air bearing 76. Plunger element 26 has an array of magnets 25 covering an outside surface thereof. Half of magnets 25 are oriented so that their north poles point radially outward and an equal number are oriented so that their north poles point radially inward. Referring momentarily to FIG. 6a, a flat projection of the arrangement of magnets 25 shows their relationship to each other. Magnets 25 include outward-oriented magnets 25a and inward oriented magnets 25b arranged in a regular pattern to form rings and columns of magnets. In the rotary-linear actuator, the arrangement shown in FIG. 6a would be projected on the cylindrical surface of plunger element 26 to form the cylindrical array shown in FIG. 7a. In this arrangement, rings of one polarity alternate with rings of opposite polarity and columns of one polarity alternate with columns of opposite polarity.

Figure 4A:
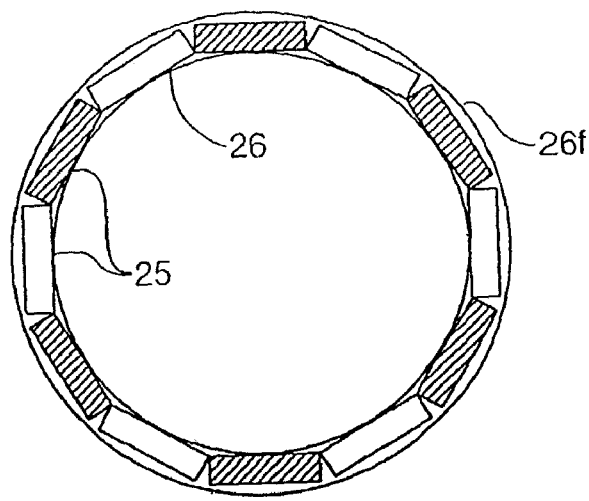
FIG. 4a is a cross section through an axis of the embodiments of FIGS. 1a and 1b in a preliminary stage of manufacture showing magnets arranged about a central plunger element.
Figure 4B:
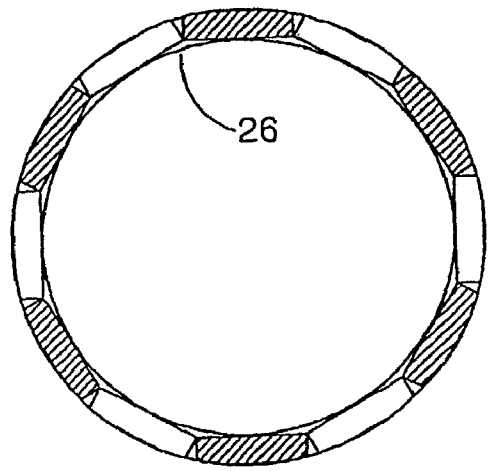
FIG. 4b is a cross section of the plunger of FIG. 4a in a further stage of manufacture showing magnets coated with epoxy after grinding to form a cylindrical outer surface.
Figure 4C:
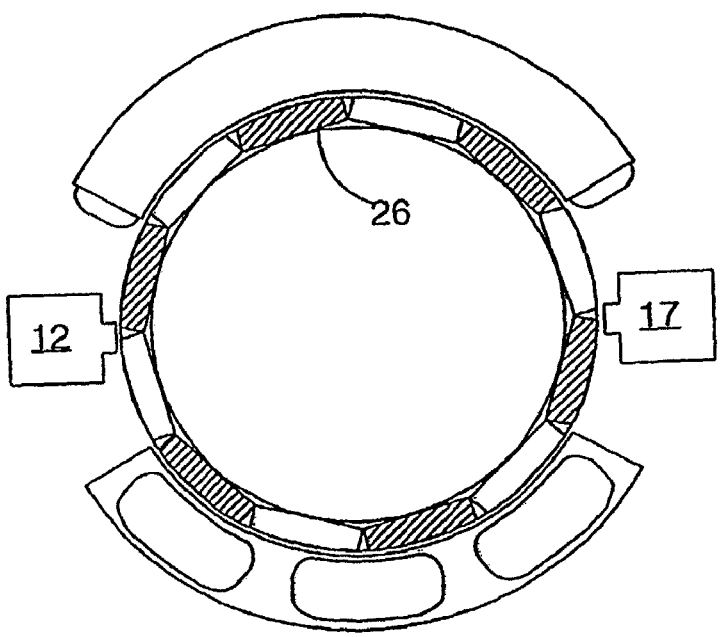
FIG. 4c is a cross section of plunger element according to an embodiment of the invention showing the arrangement of z and $\Phi$ motors and optical pickups.
Figure 7A:
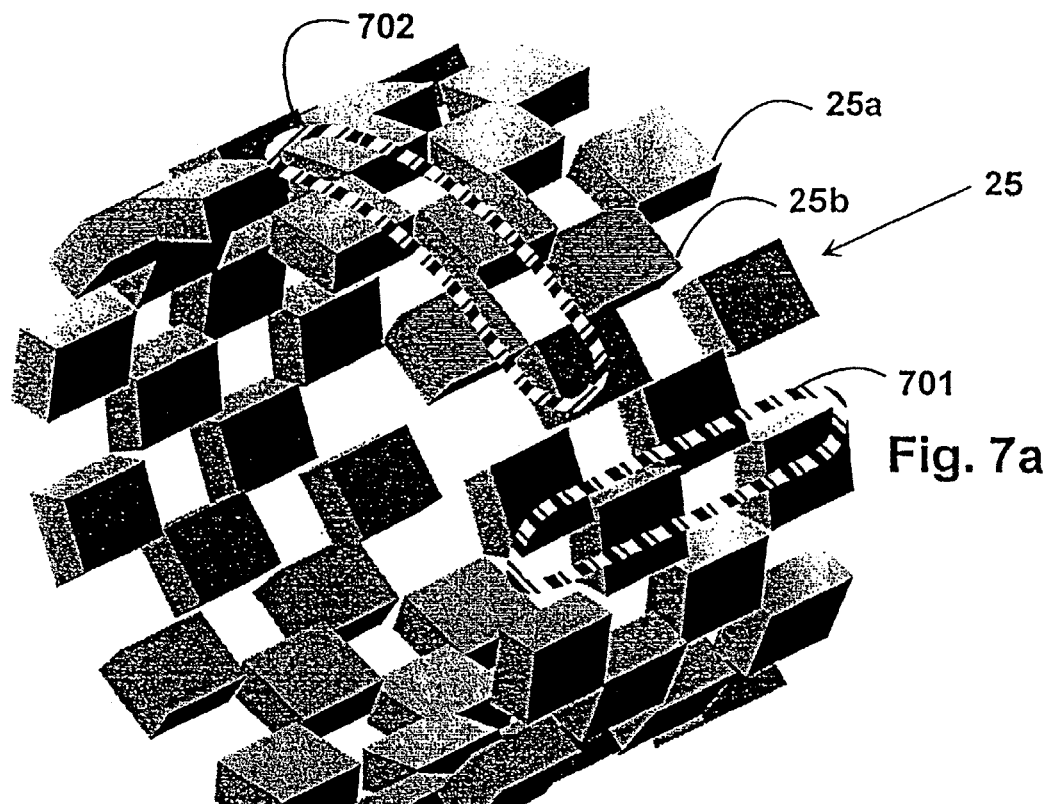
FIG. 7a shows the arrangement of magnets relative to z and Φ coils of z and Φ motors for the cylindrical plunger element of the invention.
Figure 7B:
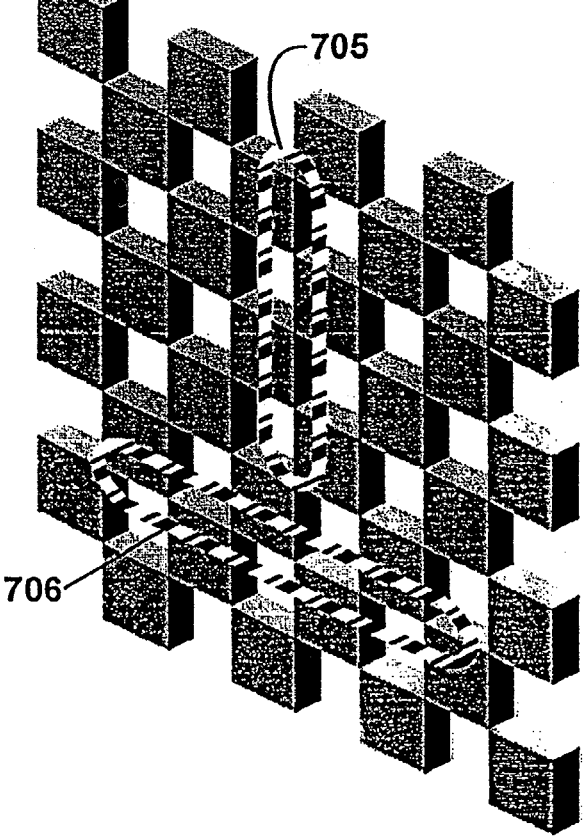
FIG. 7b shows the arrangement of magnets relative to x and y coils of x and y motors of an analogous planar x-y positioning system.

Referring also to FIG. 4c, a set of z-axis coils (for axial movement) curve around the plunger. Z-axis coils 15a are shaped to allow a current in them to create an axial force on the magnets. A set of Φ-axis coils 15b (for rotational movement) have longitudinal axes that are parallel to the axis of the plunger and are sized to allow current in them to generate a tangential force on the columns of magnets. Air is injected into a space between a center column defining the center of the annular well and the internal surface of the plunger to support the plunger. Plunger element 26 is driven in rotational and linear modes, respectively, by z motor 45 and Φ motor 46. Both z and Φ motors 45 and 46 contain coils that generate changing fields that interact with the fields generated by magnets 25 to generate a motive force on plunger element 26. As described below, an associated control system and amplifier energize the coils 15a and 15b to drive the z and Φ motors 45 and 46, respectively, such as by selectively energizing the respective coils. In FIG. 7a, positions of coils 701 of Φ motor 46 and coil 702 of z motor 45 are shown schematically relative to magnets 25. FIG. 7a shows only one coil per mode for purposes of explanation. In reality, a motor may consist of several coils. In addition, the number of magnets shown in FIG. 7a is chosen for clarity, the actual density and size would be chosen based on the application. For a practical device, many more or fewer magnets could be used, depending on the resolution and size of the actuator required for the application. In addition, the lengths and widths of coils 701 and 702 may differ substantially from that shown in FIG. 7a. Typically, 3 phase coils are used separated 120 degrees apart to provide smooth transition between phases. In the present invention, a single phase, two phase, or three-phase configurations can be used, depending on the application.

A preferred configuration consists of 10 to 16 magnets per ring of magnets. That is, for a ring of twelve magnets, when the pattern of FIG. 6a is used, there would be six magnets of one pole orientation encircling the plunger below which there would be 6 more magnets. Each magnet is separated from the others by a gap one magnet-width wide. For example, the configuration of FIG. 7a has 12 magnets per ring. This would leave enough room for the coil ends and the encoders.

Figure 1A:
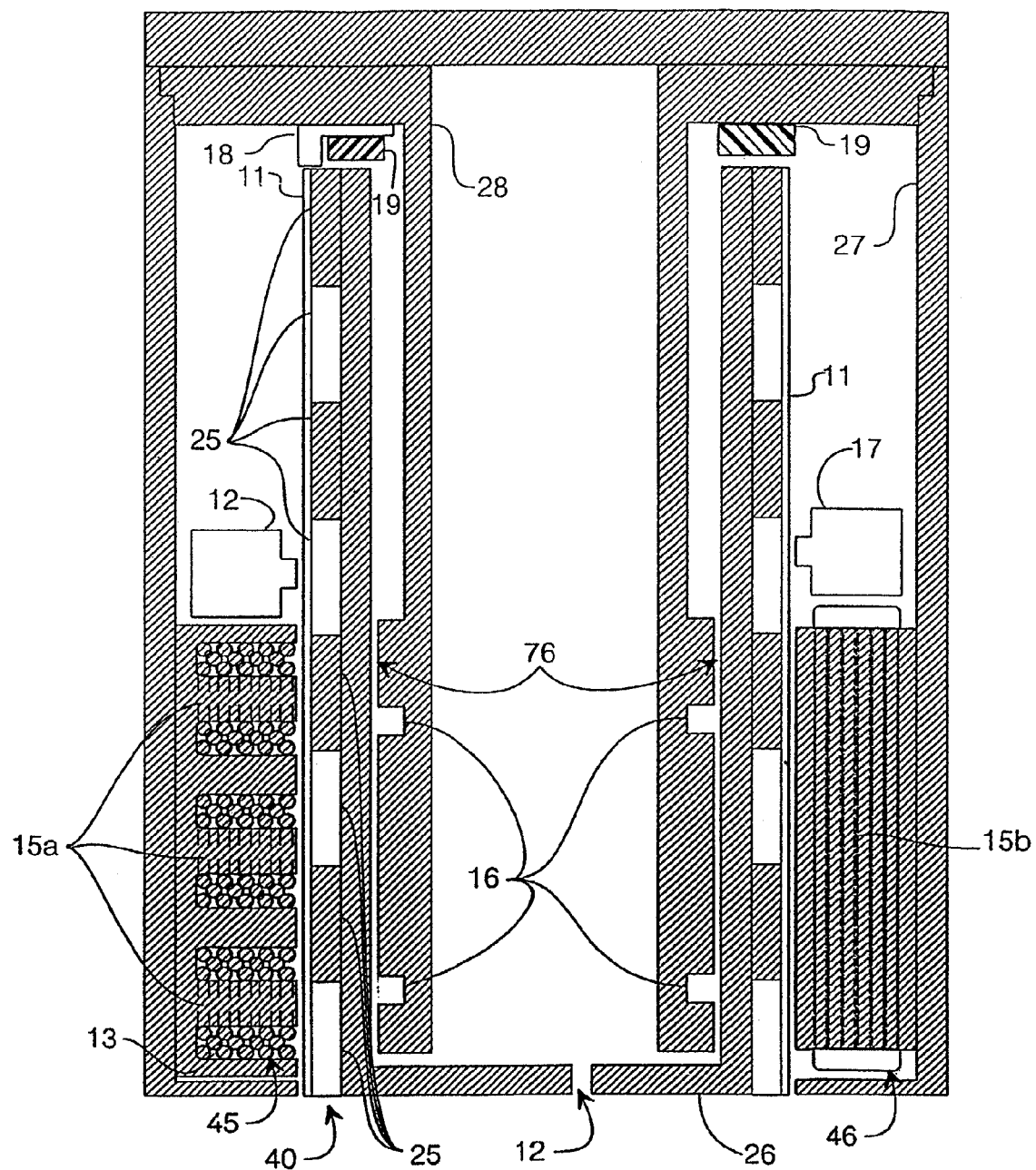
FIG. 1a is a cross-section of a rotary-linear actuator, according to an embodiment of the invention, in which a plunger is shown in a substantially retracted position.

In FIG. 1a, z motor 45 and Φ motor 46 have coils 15a and 15b embedded in laminations 13. The laminations can be manufactured from thin sheets of steel laminated together or from compacted powdered metal depending on the application and speed.

The coils can be manufactured by winding the coils in a standard manner, using copper wire surrounded by a heat-actuated glue. The z-axis coils curve around the plunger. Initially, the coils can be formed in a straight longitudinal configuration. Then, a current may be applied to the coils and the coils bent in a jig or mold to the proper shape. After the coils cool, they retain their curved shape. The coils can then be inserted in slots in the laminations and varnish or epoxy applied to the coils and laminations. Voids may be filled with epoxy. The surface adjacent the plunger can then be machined appropriately to form a surface with the proper dimensions.

In an alternative embodiment, the coils can be made in the same manner as described immediately above, except that, instead of using laminations, a powder iron, held together with glue or epoxy may be used. In such a material, the iron particles are small and insulated from each other, a high volume resistivity is obtained to minimize the generation of eddy currents. This configuration has the advantages of low cost and ease of manufacture. It has, however, the disadvantage of lower flux density.

Another configuration for the coils is to employ coils embedded in resin, only. No iron or steel is used in order to eliminate eddy currents and reduce cogging. This configuration is discussed in U.S. patent application Ser. No. 08/346,860, the entirety of which is incorporated herein by reference. This configuration is known (Anorad's LE type motor) and a design optimized around this configuration of the coils is described below with reference to FIGS. 3a–3b.

Note that although according to the above embodiments, the magnets and coils are shown lying immediately beneath smooth surfaces on the stage and base elements of the rotary-linear actuator, this is only one of other possible configurations. For example, the magnets and coils could be formed on a mold and the voids left unfilled. This would present a rough surface, but would still be operable and would avoid the machining required by the method described above.

Figure 5A:
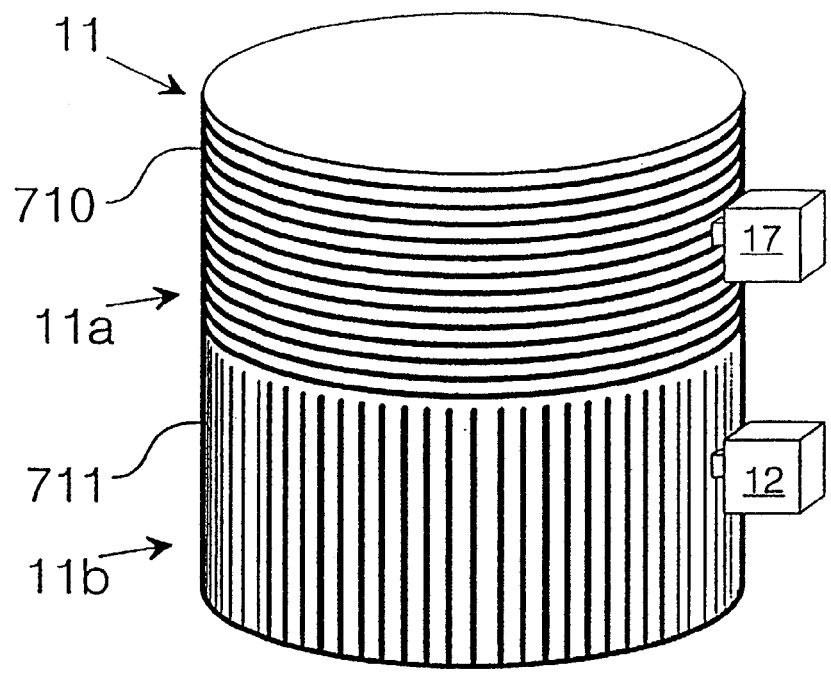
FIG. 5a shows a simplified view of plunger element with z and $\Phi$ encoders in an embodiment in which the z scale and $\Phi$ scale are formed on separate portions of the plunger.
Figure 5B:
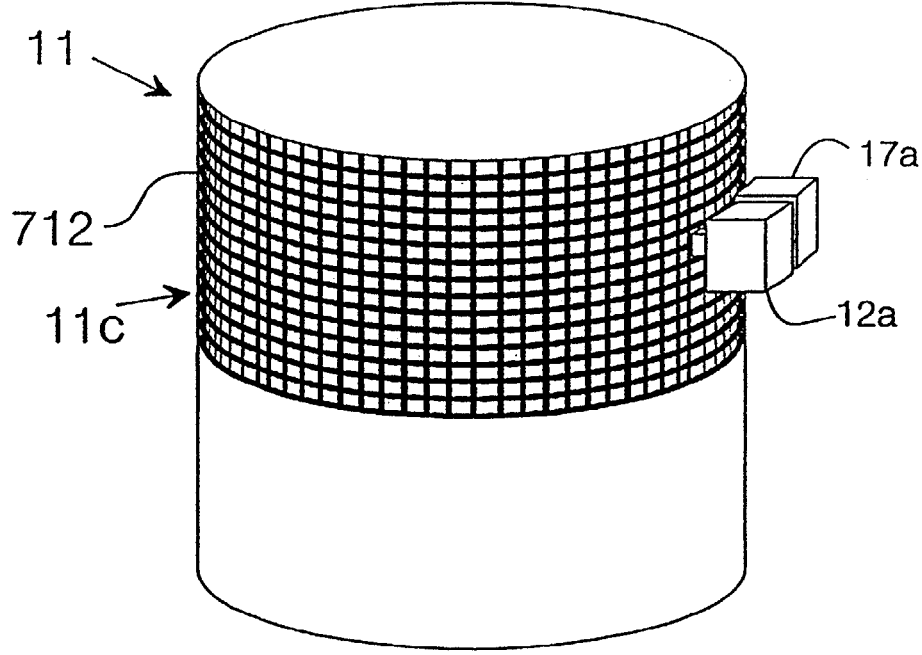
FIG. 5b shows a simplified view of plunger element with a grid scale that is scanned by both z and $\Phi$ encoders.

Referring to FIGS. 1a, 1b, 5a, and 5b, affixed to the surface of magnets 25, is a thin sheet carrying an encoder scale 11. Encoder scale 11 is etched with a pattern of reflective and non-reflective regions that are scanned by optical pickups 12 and 17 to register movement of plunger element 26. As shown in FIGS. 5a and 5b, encoder scale 11 can be formed as separate linear scales 11a and 11b or combined into one grid scale 11c. When the scales are separate, optical pickups 12 and 17 operate in the conventional way. In addition, when using the configuration of scale 11a, optical pickups 12 and 17 must be arranged as shown in FIG. 5a or another appropriate way so that they "see" the appropriate scale throughout the positioning range. Thus, a different arrangement of optical pickups 12 and 17 would be required from that shown in FIGS. 1a and 1b. When the scales are combined as for grid scale 11b shown in FIG. 5b, optical pickups 12a and 17a are somewhat different from the conventional linear design. Optical pickup 12a, for example, projects light at, and senses reflected light from, an elongated detection region with a horizontal axis. The elongated detection region wraps partially around the cylindrical surface of scale 11 so that a ring of reflective and non-reflective patches are subtended. When plunger element 26 moves, at least partly, in a direction perpendicular to the long axis of the detected area (z-direction) it causes successive columns of reflective and non-reflective patches to pass through the detected area alternating with the gaps between the successive rings. The reflected light is averaged over the detection region. As plunger element 26 moves, a signal, proportional to the average reflected energy, is output by optical pickup 17a. The signal is responsive, primarily, only to movement in the z-direction. Movement in the Φ-direction does not cause the signal to vary significantly because of the shape of the region and its alignment with grid scale 11c. The situation is similar with regard to Φ-direction movement and z-direction optical pickup 12a.

Figure 1B:
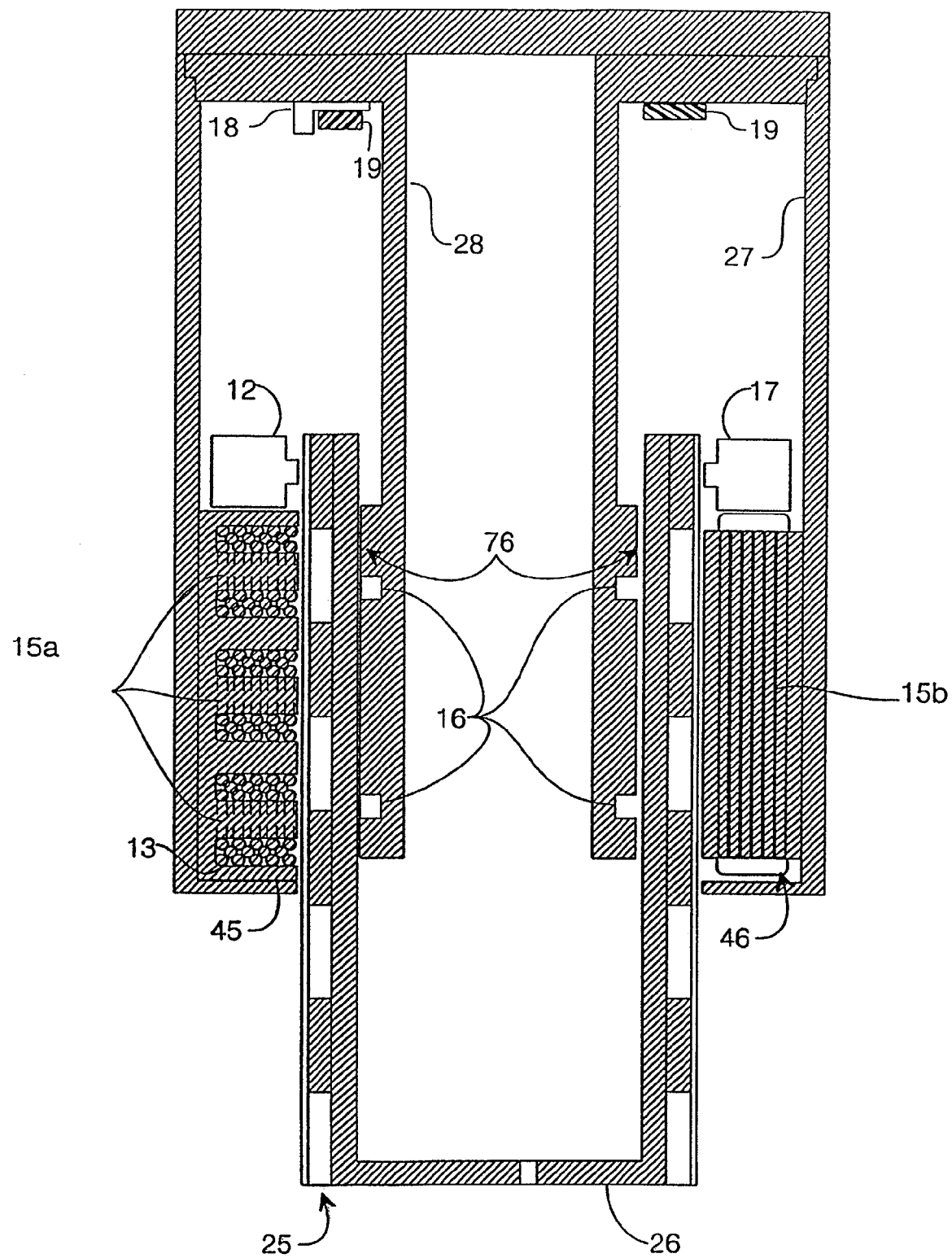
FIG. 1b is a cross-section of the rotary-linear actuator of FIG. 1a in which the plunger shown in a substantially extended position.
Figure 2A:
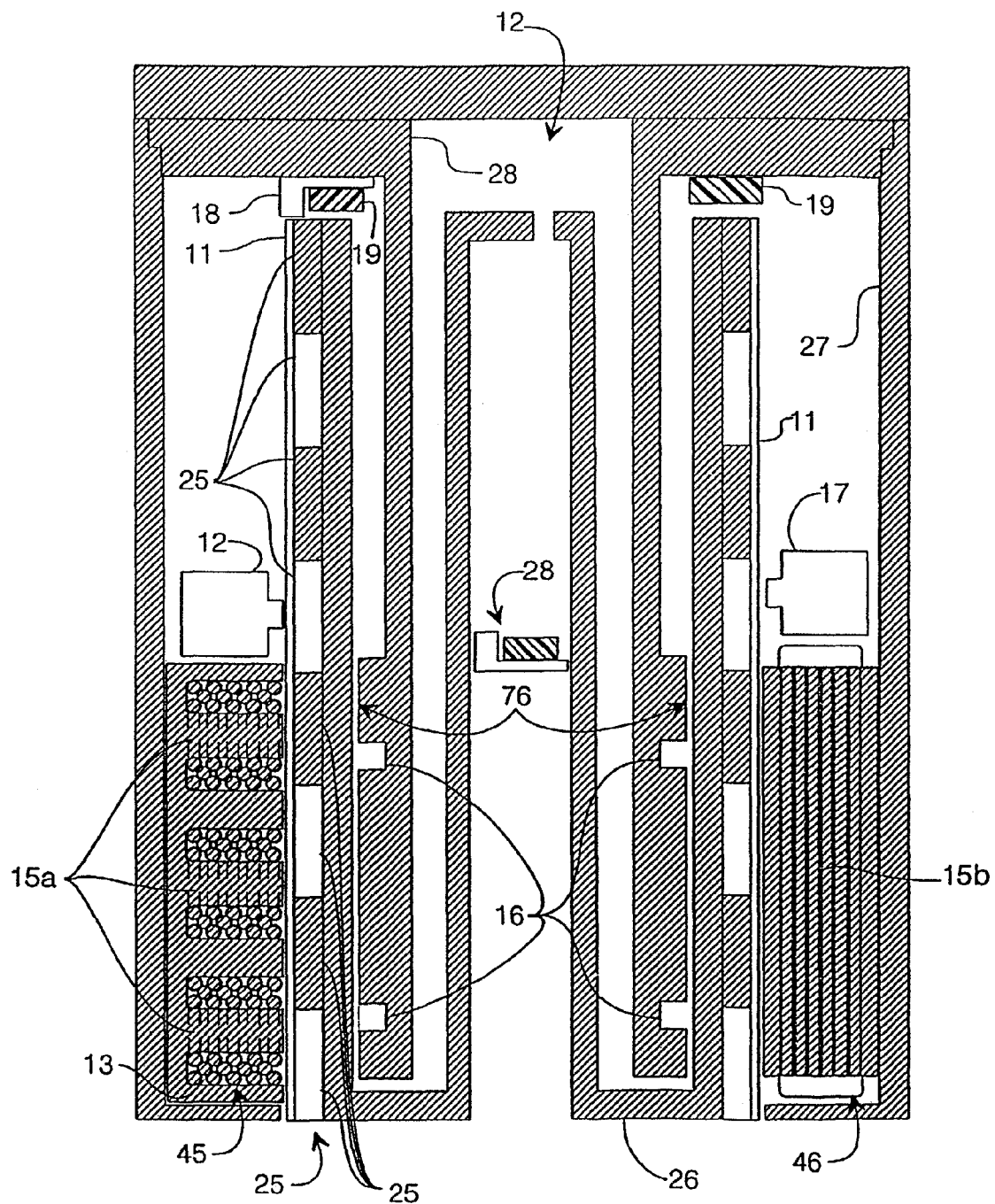
FIG. 2a is a cross-section of a rotary-linear actuator, according to another embodiment of the invention, in which a plunger is shown in a substantially retracted position.
Figure 2B:
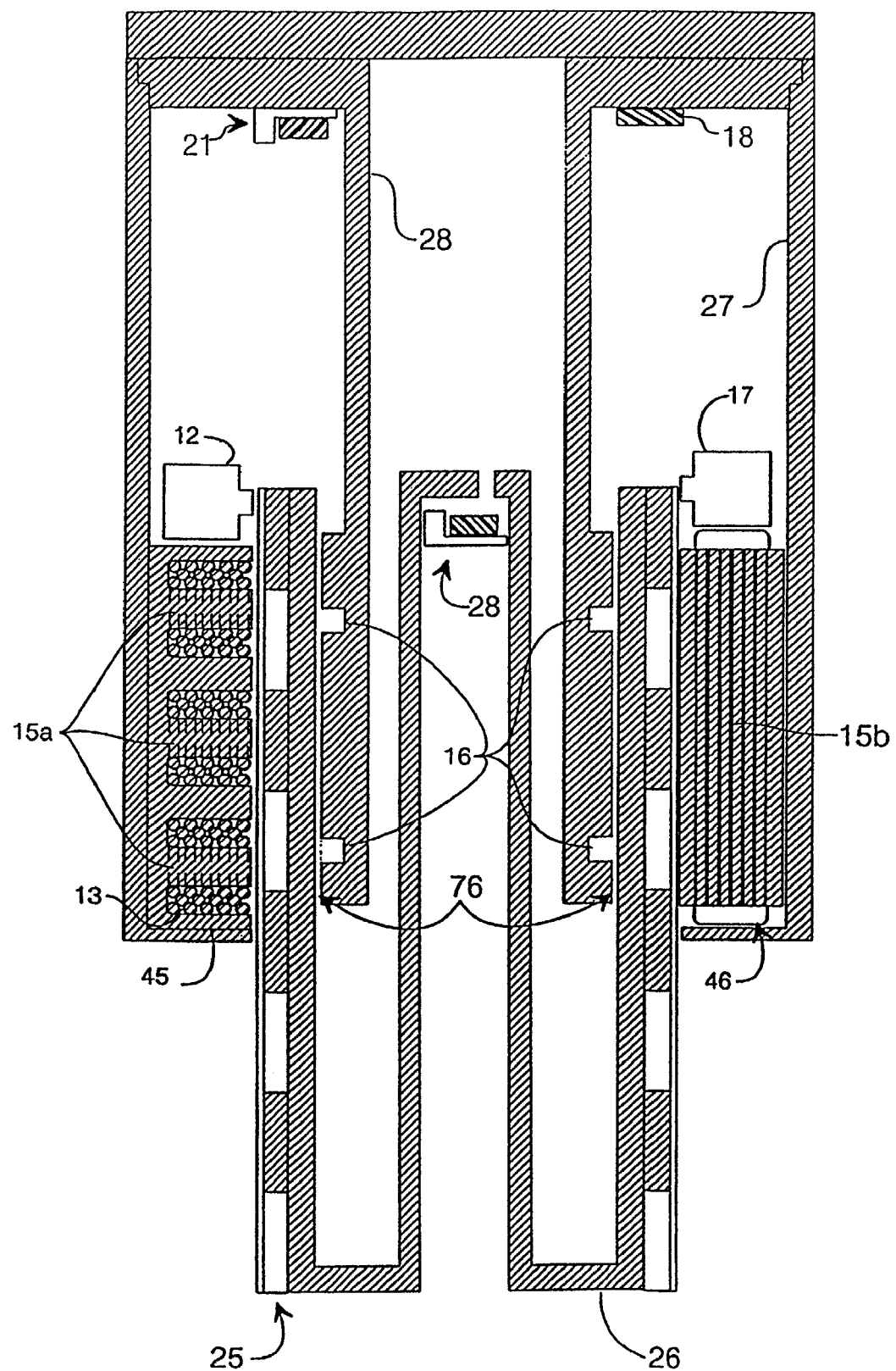
FIG. 2b is a cross-section of the rotary-linear actuator of FIG. 2a in which the plunger shown in a substantially extended position.

Travel of plunger element 26 is limited in the retracted direction (the direction moved by plunger element 26 in going from the position shown in FIG. 1b to the position shown in FIG. 1a) by vertical stops 19 and a limit switch 18. Suitable means may be provided (not shown) for limiting travel in the extension direction (the direction moved by plunger element 26 in going from the position shown in FIG. 1a to the position shown in FIG. 1b). A variation on the configuration of FIGS. 1a and 1b, shown in FIGS. 2a and 2b, permits an extension-direction stop and limit switch assembly 28 to be affixed to motor support 27 and located at the center of plunger element 26 (Note that stop and limit switch assembly's support structure is not shown, but could be provided in a number of ways, such as by attaching it to a stalk running through a center hole in the hollow center column portion of plunger assembly 26). The operation of the limit switch 18 further may be sensed, as described below, to facilitate restricting extension and/or retraction beyond selected levels that might damage the actuator.

Figure 3A:
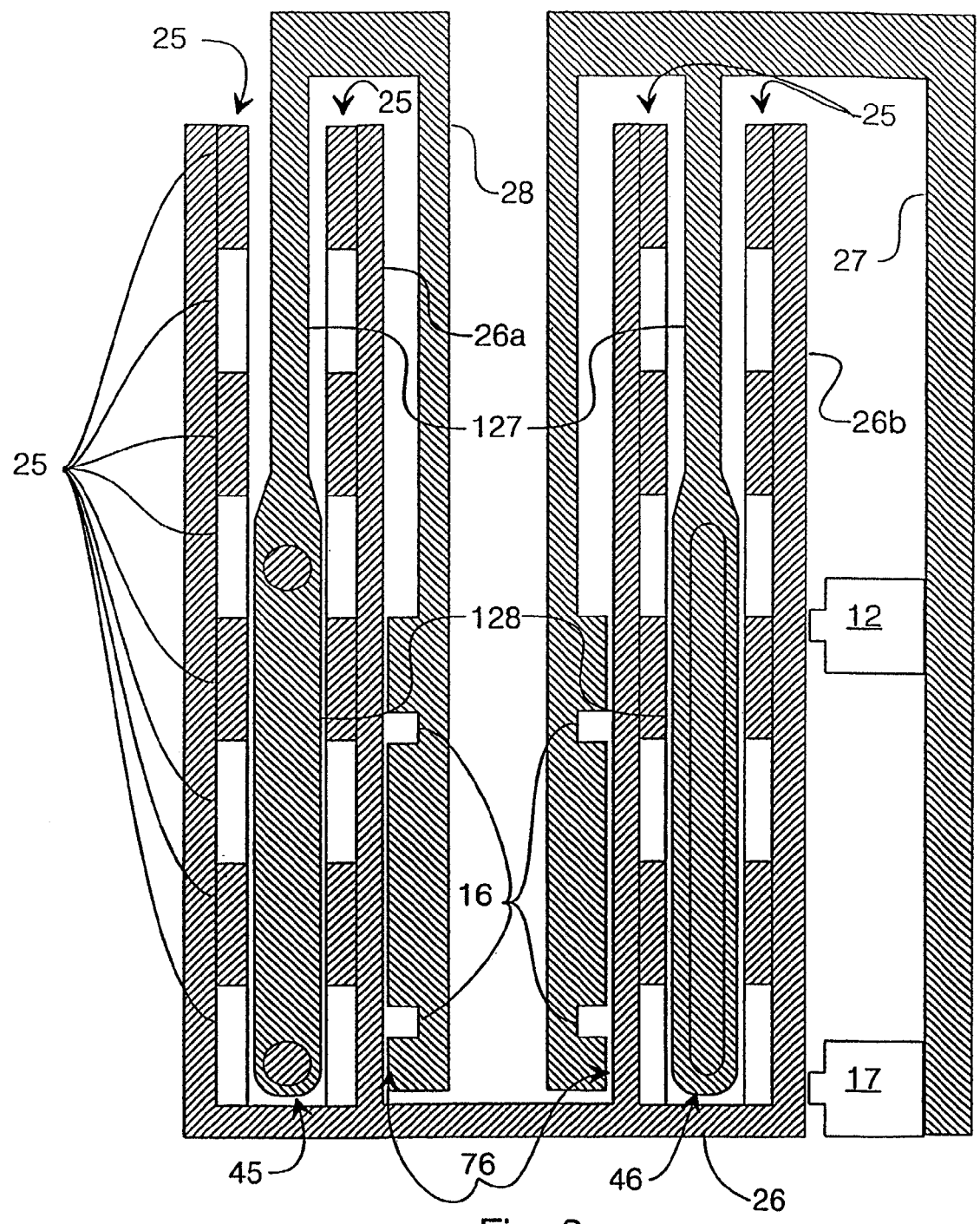
FIG. 3a is a cross-section of a rotary-linear actuator, according to still another embodiment of the invention, in which a plunger is shown in a substantially retracted position.
Figure 3B:
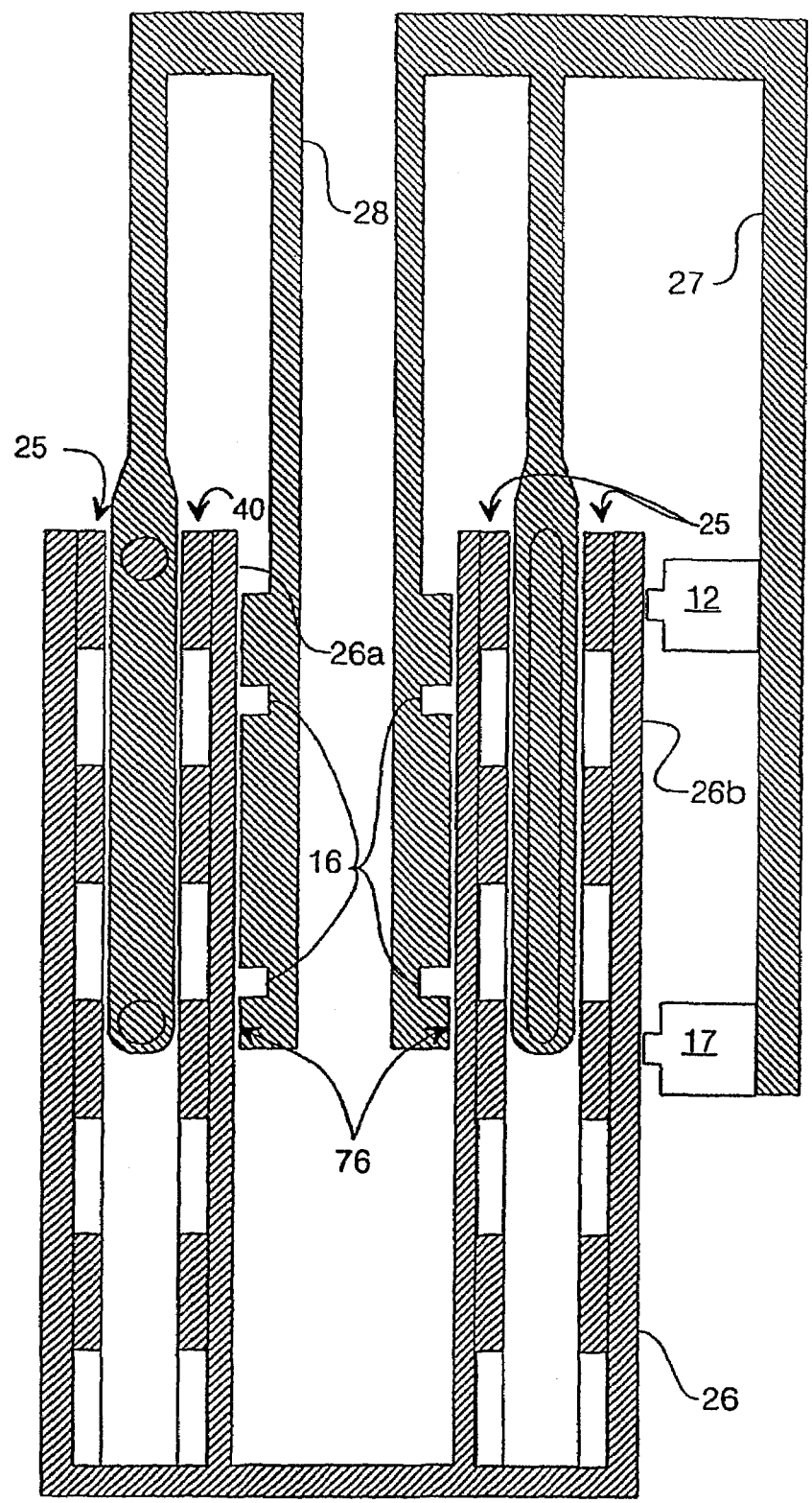
FIG. 3b is a cross-section of the rotary-linear actuator of FIG. 3a in which the plunger shown in a substantially extended position.
Figure 8:
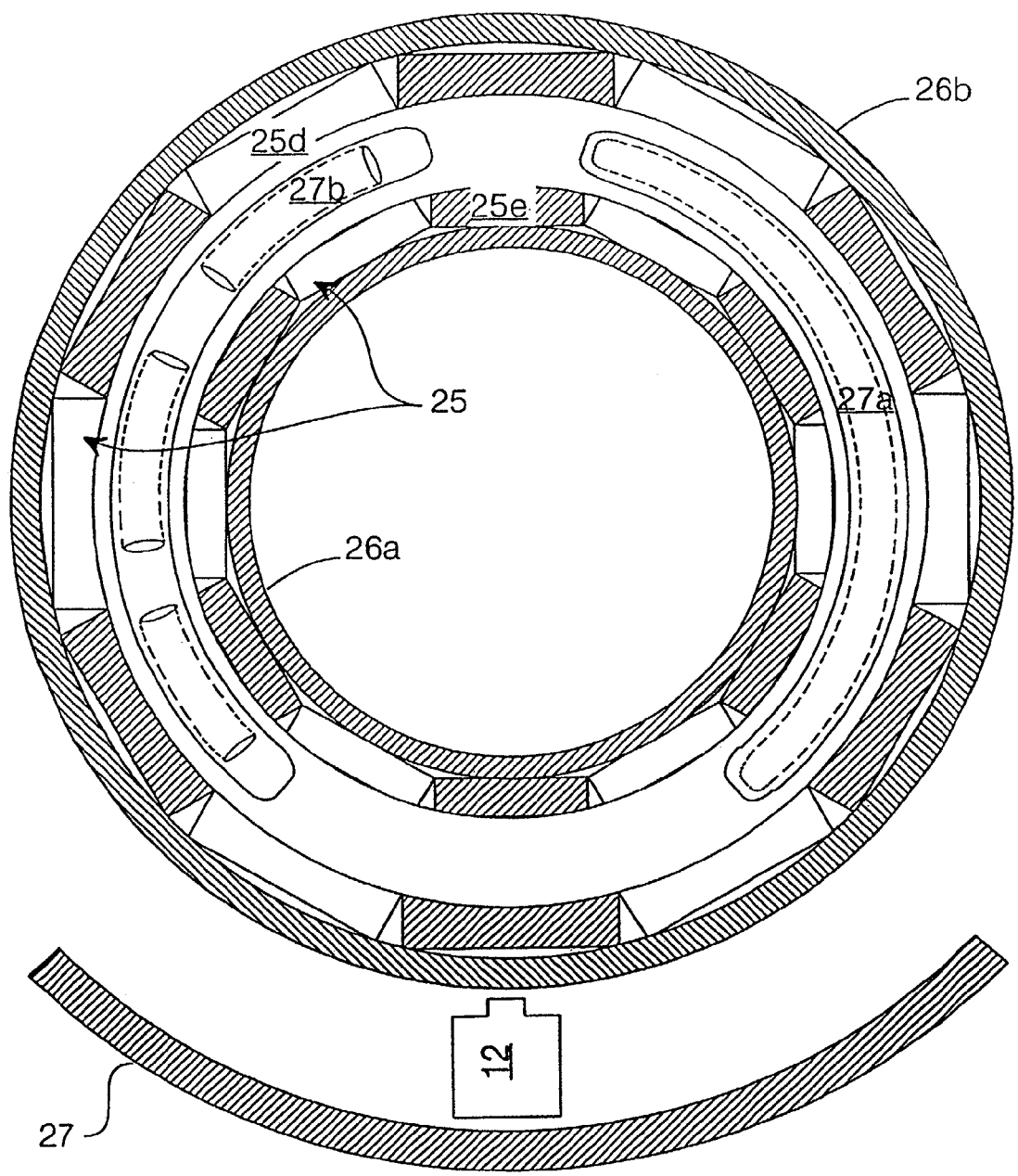
FIG. 8 is a cross section view of the embodiment of FIGS. 3a and 3b.

Referring to FIGS. 3a, 3b, and 8 according to another embodiment of the invention two sets of magnets 25 are affixed to concentric inner and outer cylindrical portions 26a and 26b of plunger element 26. Air bearing 76 supports inner cylindrical portion 26a. The coils that generate the changing magnetic fields that interact with the fields generated by the two sets of magnets 25 are contained in z and Φ motors (shown in FIG. 8) embedded in a motor cylinder 128 supported by a motor support cylinder 127. The z and Φ motor coils are arranged similarly to the arrangement depicted in FIG. 7a surrounded by two concentric cylindrical arrays of magnets. However, in the embodiments shown no laminations are employed—the coils are embedded in resin alone. The fields generated by z and Φ motors 27a and 27b interact with the inner and outer sets of magnets 25e and 25d. So that there is consistent response and maximum power at all rotational positions of plunger element 26, the inner (25e in FIG. 8) and outer sets of magnets (25d in FIG. 8) are sized to maintain rotational symmetry.

In the embodiment of FIGS. 3a and 3b, an encoder scale (not shown), identical to encoder scale 11, is affixed to the outer cylindrical surface of outer cylindrical portion 26b of plunger element 26. Optical pickups 12 and 17 are located on motor support 27.

Figure 3C:
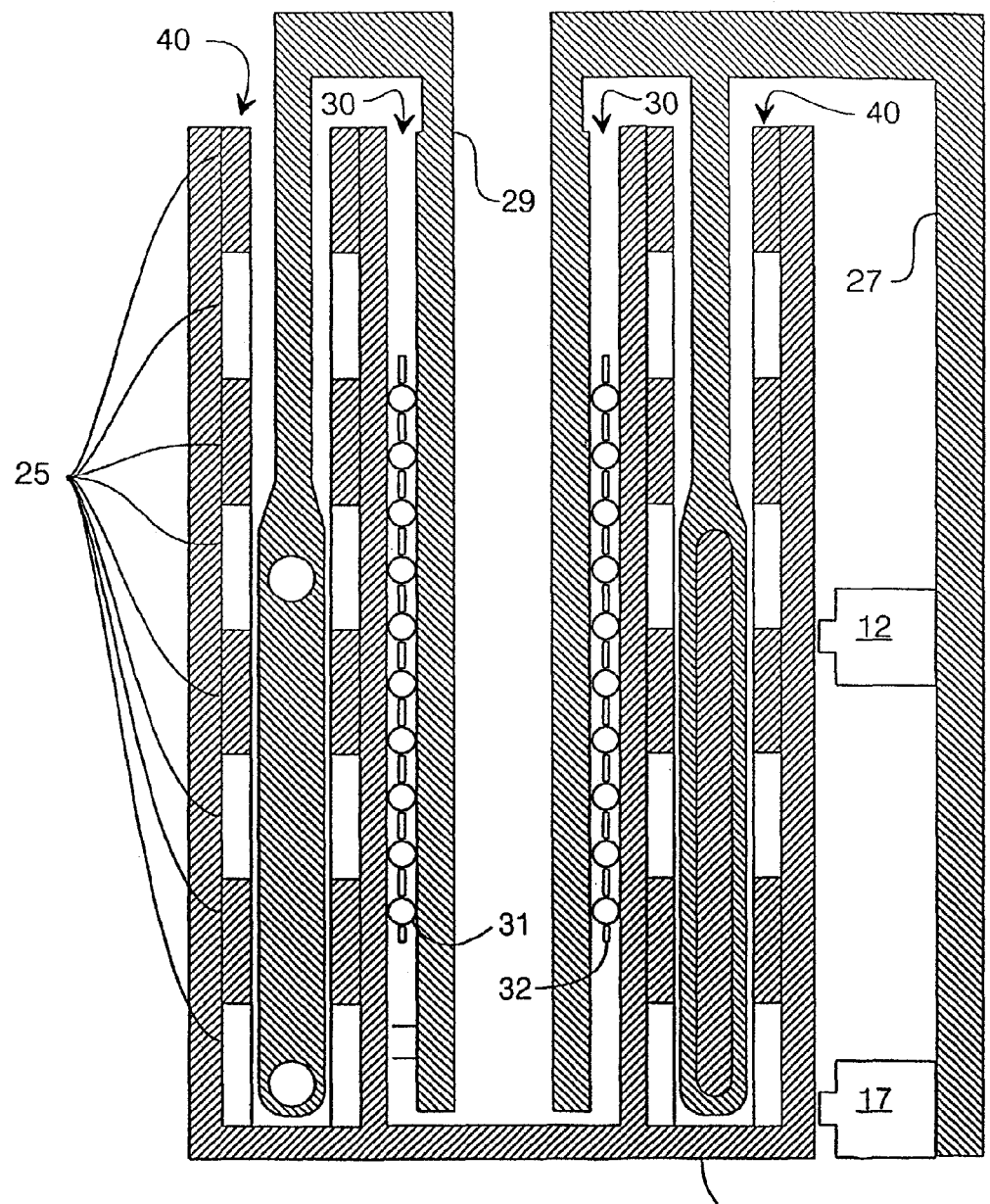
FIG. 3c is a cross-section of rotary-linear actuator similar to that of FIGS. 3a and 3b, but in which the air bearing supporting the plunger is replaced with a bushing with ball-bearings capable of accommodating axial and tangential movement.

Referring to FIG. 3c, an alternative way of supporting plunger element 26 with respect to motor support 27 is to use a cylindrical bushing 30 with ball bearings 31 held in a cylindrical cage 32. Bushing 30 is applicable to all of the embodiments described above and others. Ball bearings 31 are selected in size to develop a proper pre-load. The surfaces adjacent ball bearings 31 may be hardened for durability and precision.

Referring to FIGS. 4a and 4b, to manufacture plunger element 26 with magnets 25, magnets 25 are attached with adhesive to plunger element 27 and coated with epoxy 26f. After epoxy 26f hardens, plunger 27 is machined to form a precision round surface. The above procedure, adapted according to conventional machine shop practice, can be applied to all the embodiments described, and others. For example, the embodiment shown in FIG. 8 requires a precise inside surface of magnets 25d, on outer cylindrical portion 26b. These magnets face inwardly but could be assembled with epoxy and machined as described above to produce a clean cylindrical inside surface.

Figure 6B:
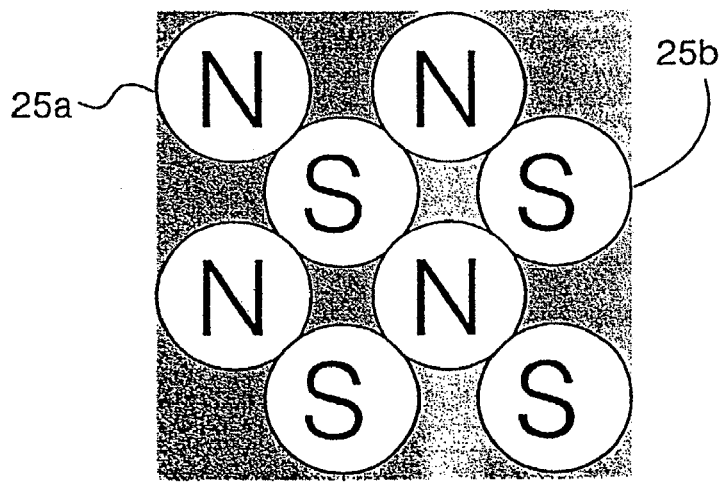
FIG. 6b shows a planar projection of the magnet array attached to the plunger element or a base according to another embodiment of this feature of the invention.
Figure 6C:
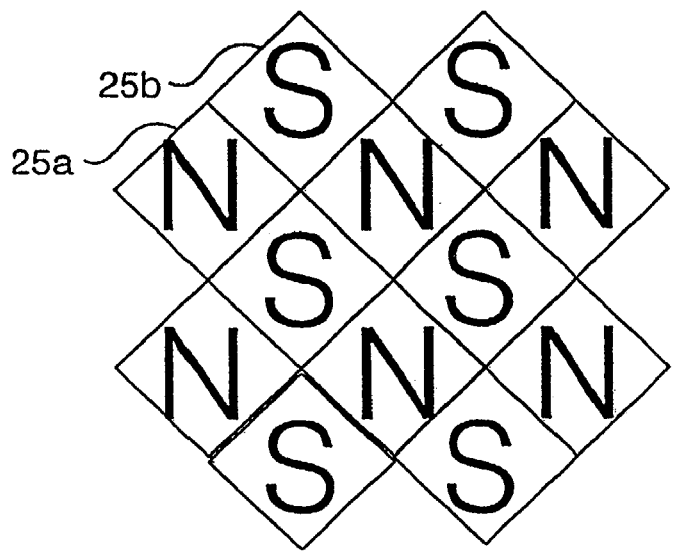
FIG. 6c shows a planar projection of the magnet array attached to the plunger element or a base according to still another embodiment of this feature of the invention.

Referring to FIGS. 6a, 6b, and 6c, note that although in the embodiments described above, magnet 25 arrays with 50% packing density (FIG. 6a) are used, other arrangements are possible. For example, magnets 25 could be round and arranged in a pattern such as that of FIG. 6b or magnets 25 could be diamond shaped and arranged as shown in FIG. 6c. The alternative arrangements shown in FIGS. 6b and 6c have different torque characteristics than that of FIG. 6a which may be desirable for a rotary-linear actuator in specific applications. For example, the arrangement of FIG. 6c with a coil of very narrow width can achieve high peak torque. With a wider coil, it is characterized by low cogging. Peak torque of the arrangement of FIG. 6b is also potentially greater than that of the arrangement of FIG. 6a, depending on the coil width.

Figure 9:
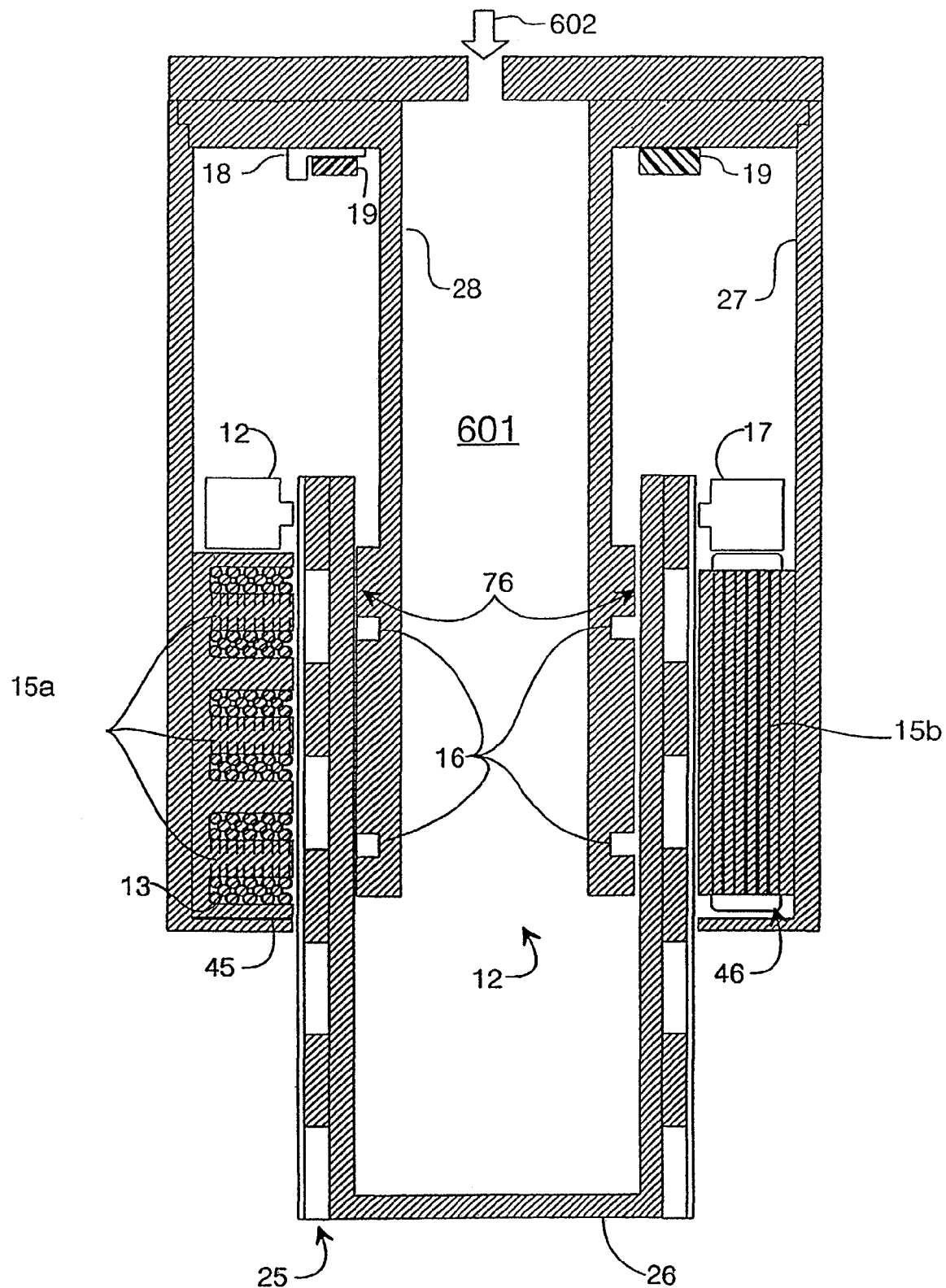
FIG. 9 is a cross section view of an embodiment of the invention having a preferred type of air-cylinder weight compensation system.

Referring to FIG. 9, to avoid loss of potential power and excess motor heat, the weight of plunger element 26 and tools or work-pieces mounted thereon could be compensated for by means of an integral air cylinder 601 formed by sealing the concentric space between motor support 27 and plunger element 26. Connected to a pressure-regulated source of air 602, vacuum or pressure is applied generating a net force on plunger element 26. This source of force could be used to compensate for the weight of a tool or workpiece or other fixture attached to plunger element 26. Alternatively this external force could be used in the operation to which the invention is applied, for example, applying an axial force to a screwdriver. Leaks due to the air bearing (or roller bushing) could be compensated for by the air supply.

Another possible way to make a pressure- or vacuum-augmented version of the rotary-linear actuator is to use a separate sealed air-operated piston/cylinder device (not shown) connected between motor support 27 and plunger element 26 inside the space labeled 601. In addition, note that fluids other than air could also be used to achieve a similar effect, for example, hydraulic fluid could be used instead of air. It is to be appreciated that various sensing arrangements could be employed to monitor the vacuum or supply of air pressure within the support 27 to facilitate necessary adjustments, such as due to changes in load conditions.

Although in the embodiments described, a plunger has permanent magnets and is internally arranged in a motor support, the invention can readily be changed by placing the motors on the plunger element and the permanent magnets on the motor-supporting elements as in the above embodiments. Likewise, the optical pickups could be placed on the plunger element and the scales on the motor support rather than the other way around as shown in the preferred embodiments. In addition, other variations are possible such as providing a single long pillar lined with permanent magnets and a cylindrical motor element with two coaxial open ends. The latter would provide any degree of linear travel required. The encoders would be carried on the motor element and the pillar would have a grid scale on its outer surface. Many other variations are possible. These alternatives are considered to fall within the bounds of at least some of the claims recited below.

Also, although in the embodiments described above, the magnets and coils are arranged so that one set of coils produces forces only in the Φ direction (perpendicular to the axis of rotary movement) and another set of coils produces forces only in the direction parallel to the axis of rotary movement, it is recognized that other arrangements are possible. For example, the magnets and coils can be arranged so that each coil, or set of coils, produces forces having both axis-parallel and axis-perpendicular components. Such variations are considered to be within the scope of the invention.

Figure 10:
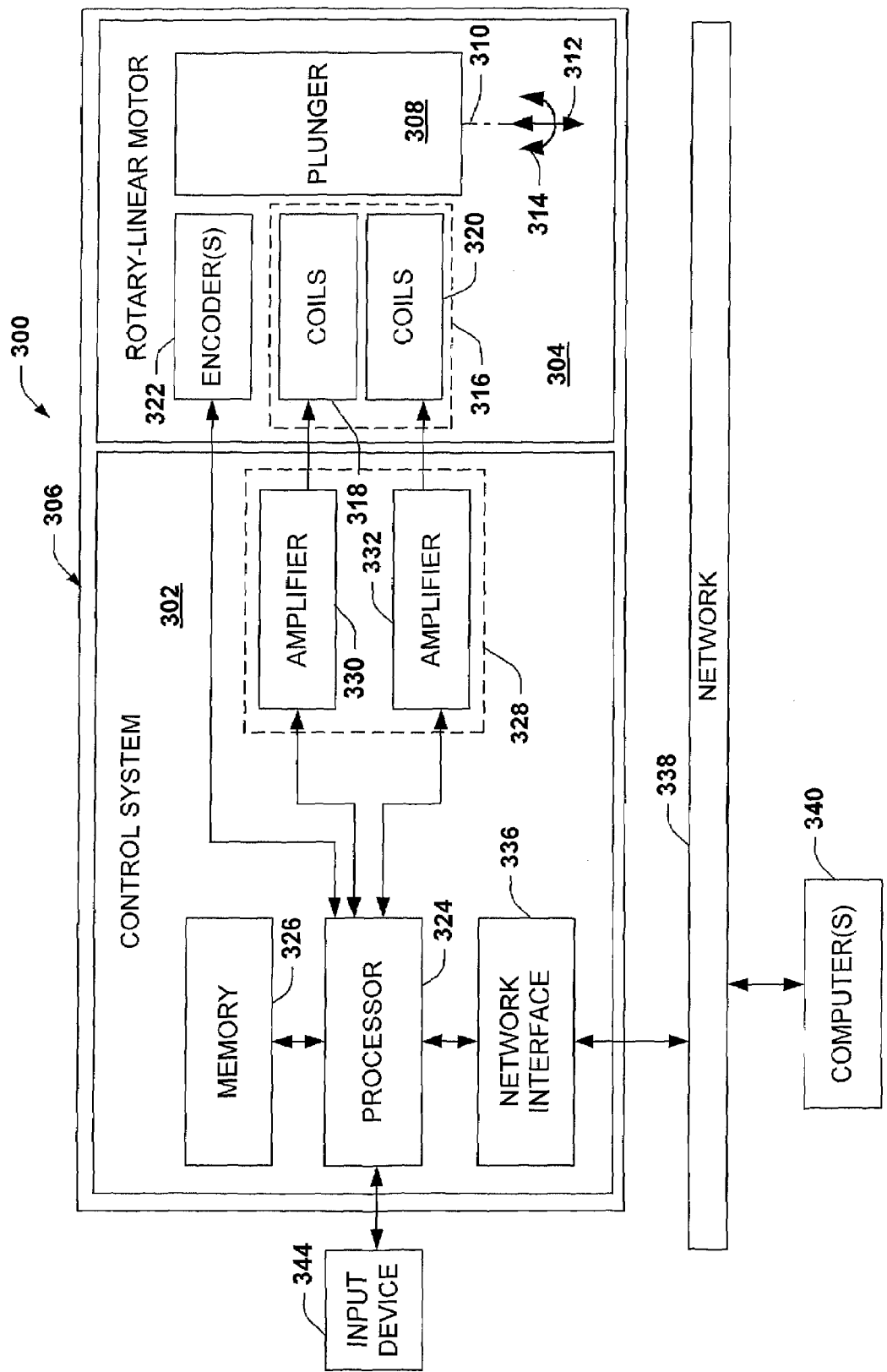
FIG. 10 is a functional block diagram of a rotary-linear actuator system in accordance with an aspect of the present invention.

FIG. 10 illustrates an example of a rotary-linear motor system 300 in accordance with an aspect of the present invention. The system 300 includes a control system 302 coupled with a rotary-linear motor 304. In accordance with an aspect of the present invention, the control system 302 and the rotary-linear motor 304 are contained within an integrated module 306. By packaging the control system 302 and motor 304 in an integrated module, the number of conducting wires needed may be significantly reduced. As described herein, the rotary-linear motor 304 includes a plunger 308 having a longitudinal axis 310. The plunger 308 is both moveable linearly in a direction parallel to its axis 310, indicated at 312, as well as rotatably in a direction about the axis, indicated at 314. Thus, the plunger 308 is capable of both rotary and linear motion relative to its axis 310.

The motor 304 also includes a coil system 316 that is operative to effect desired movement of the plunger 308. In this example, the coil system is schematically depicted as including coils 318 and 320. One of the coils 318 is operative, for example, to provide an electric field to effect rotational movement of the plunger 308 in the direction of arrow 314 based on its energization level. Similarly, when the other coil 320 is energized, it effects linear movement of the plunger 308 in the axial direction of arrow 312.

The motor 304 further includes an encoder system 322, such as may include one or more encoders, for sensing the position of the plunger and providing an encoder signal indicative of the sensed position. The encoder system 322 may include an optical sensor, such as described above, in which the sensor detects markings or other indicia located on and moveable with the plunger 308. It is to be understood and appreciated, however, that any type of encoding system (e.g., optical, magnetic, inductive, capacitive, etc.) could be utilized in accordance with an aspect of the present invention. One or more limit switches (see, e.g., switch 18 in FIG. 1A) also may be employed to inhibit linear movement in the retracted and/or extended conditions.

The control system 302 includes a processor 324 coupled to memory 326, which may be programmed and/or configured to control operation of the rotary-linear motor 304 in a desired manner. The memory 326 stores program code executed by the processor 324 for carrying out operating functions of the system 300 as described herein. The memory 326 also serves as a storage medium for temporarily storing information such as various sensed conditions of the module, an indication of the control information implemented by the processor 324, and other data that may be employed in carrying out the present invention.

The processor 324 is coupled to an amplifier system 328, which may include one or more amplifiers 330 and 332. Because the processor 324 and amplifier system 328 are integrated within the control system 302, a voluminous wiring harness may be obviated. Each of the amplifiers 330, 332 is coupled to a respective one of the coils 318, 320 and is operative to control energization of the respective coils. The amplifiers 330 and 332 may include switching networks for providing a desired level of electrical current (e.g., by pulse-width-modulation or linear current control) to the coils 318 and 320 based on control signals from the processor 324. The processor 324 also is connected to the encoder system 322 for receiving position information indicative of the position and/or movement of the plunger 308. The processor 324 thus controls the amplifiers 330 and 332 to, in turn, control energization of each phase of the respective coils 318 and 320 based on the position information so as to effect desired movement of the plunger 308.

As mentioned above, the coils 318 and 320 may be three-phase coils, although other number of phases could be utilized. A power supply (not shown) provides operating power to the module 306. Any suitable power supply (e.g., battery, line power) may be utilized to carry out the present invention.

By way of example, the control information may be derived by using a look-up table having predetermined stored values or by calculation in accordance with a desired control function. That is, executable instructions and/or program data are stored in the memory 326 to define operating characteristics for the module 306. The control information is derived according to the program instructions executing at the processor 324.

The processor provides corresponding control signals to each of the amplifiers 330 and 332 to selectively energize each coil. The module 306 further may include current sensors (not shown) that provide current feedback information, based on which the processor 324 may adjust the control signals to the amplifiers 330 and 332 to appropriately increase or decrease the amount of current being provided. In addition or alternatively, the executable instructions in memory may control the module to implement a set of predefined movements with the rotary linear motor 304, such as may include a combination of rotational or linear movements of the plunger 308 along the respective Z or Φ axes. The particular movements will vary as a function of the application in which the system 300 is being utilized. The processor 324 may control each amplifier independently or dependently according to the stored program instructions.

In accordance with an aspect of the present invention, the control system 302 also includes a network interface 336 for communicating control and/or diagnostic information between the module 306 and an associated network 338. The network 338 may implement a wired (e.g., electrically conductive or optical) or wireless (e.g., Bluetooth, cellular, etc.) data communications protocol. Those skilled in the art will understand and appreciate various data communications protocols (e.g., TCP/IP, Ethernet, Asynchronous Transfer Mode (ATM), Fiber Distributed Data Interface (FDDI), Fibre Channel, etc.) that could be utilized to implement suitable data communication over the network 338 in accordance with an aspect of the present invention.

The network interface 336 provides a mechanism through which programming and/or monitoring of the module 306 may be facilitated. For example, one or more computers (or other associated terminals) 340 coupled to the network 338 may monitor and/or control one or more such modules 306. In addition, multiple such modules may be programmed to cooperate with each other, such as based on information communicated between the modules over the network 338 and/or from the computer 340.

By way of illustration, each module 306 and/or one or more individual components of the module may have a network address or other identifying characteristics to enable data to be routed over the network 338 to and/or from the module and its components. The processor 324 may receive information addressed to a component at the module 306, for example, via the network interface 336. The processor 324 may route appropriate data to the memory 326, such as when the data corresponds to program instructions to be implemented by the processor. In addition or alternatively, the processor 324 may communicate with a particular component or components within the module 306 based on the instructions associated with the received data. The processor 324 may interrogate such components to obtain status or health information useful for diagnostic analysis. The processor 324 may perform diagnostic evaluation of the components and/or forward such information to the computer 340 via the network 338 for evaluation. As a result, the computer 340 may detect components (e.g., amplifier system 328, encoder 322, limit switches 18, vacuum/air pressure sources, etc.), which may be out of calibration or otherwise not operating within expected parameters, and provide corresponding program data to correct such conditions. Additionally or alternatively, recalibration program data may be addressed to one or more appropriate components of the module 306 to recalibrate or configure associated operating parameters. The computer 340, for example, may provide such program data according to module condition data previously sent over the network 338 to the computer. In this way, process conditions may be optimized as needed or on a regular basis according to detected operating characteristics of the module and/or one or more of its components.

A user input device 344, such as a keypad or keyboard, also may be directly coupled to the control system 302 to enable a user to program and/or configure different aspects of the motor system 300. While the input device 344 is illustrated as being separate from the module 306, it is to be appreciated that the input device could also be integrated into the module. For example, the input device 344 may be employed to select different pre-programmed functions and/or operating parameters which may individually or in combination provide a desired operating routine for the motor system 300. The available functionality may be defined by program data received from the computer 340.

Figure 11:
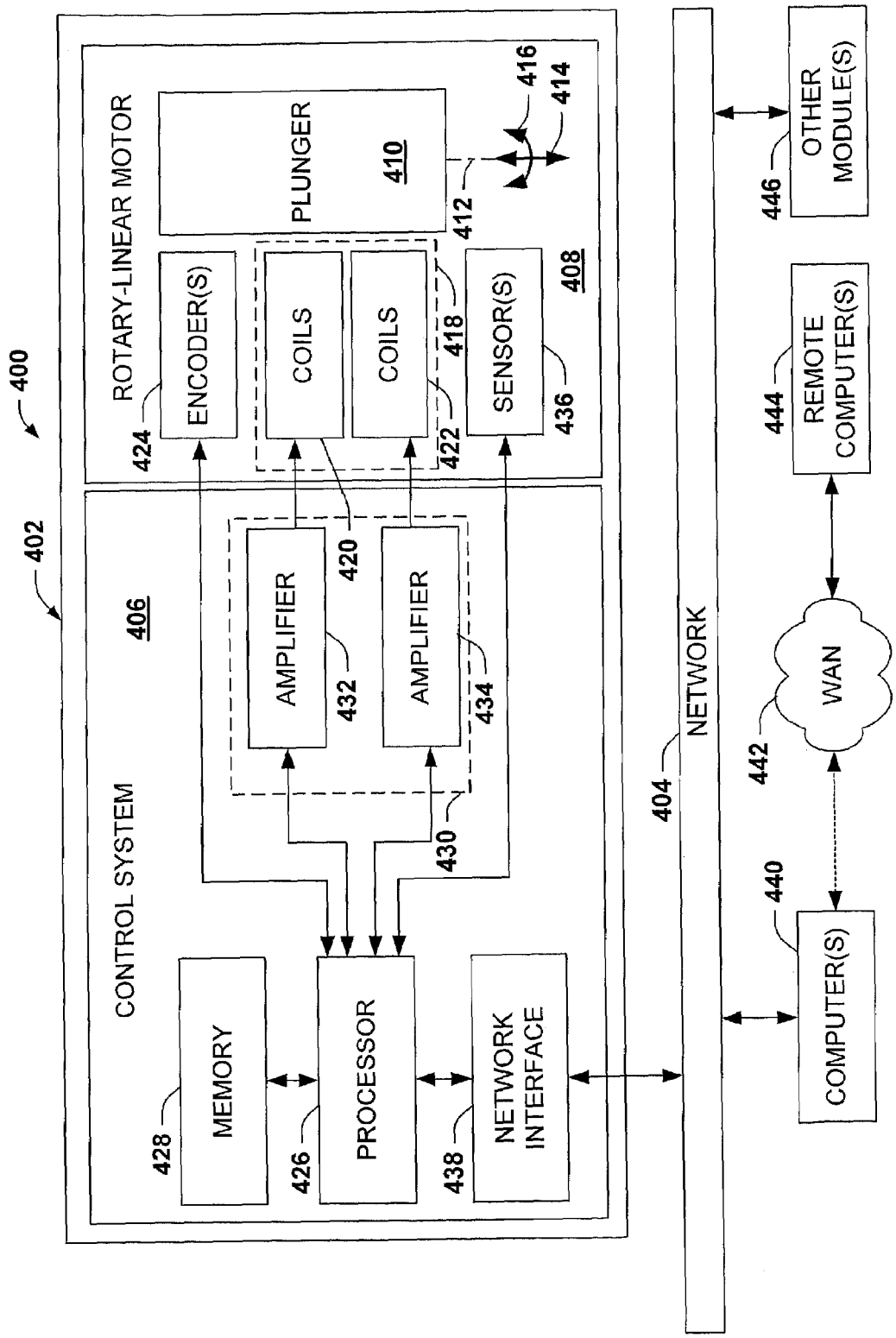
FIG. 11 is a functional block diagram of a rotary-linear actuator system in accordance with another aspect of the present invention.

FIG. 11 illustrates another example of a rotary-linear motor system 400 that includes an integrated motor and control module 402 coupled to a network 404 in accordance with an aspect of the present invention. Because much of the configuration and operation of the module 402 is substantially similar to that described above with respect to FIG. 10, a detailed description of such features has been omitted for sake of brevity.

Briefly stated, module 402 includes a control system 406 coupled with a rotary-linear motor 408. The rotary-linear motor 408 includes a plunger 410 that is moveable linearly along its longitudinal axis 412 in a direction indicated by arrow 414 and rotatably about its axis, as indicated by arrow 416. A coil system 418 includes coils 420 and 422, which are operative to effect movement of the plunger 410 when energized. An encoder system 424 senses the position and/or movement of the plunger 410 and provides an encoder signal indicative thereof.

The control system 406 includes a processor 426 coupled to memory 428 to control the rotary-linear motor 408. The processor 426 is coupled to an amplifier system 430 that includes one or more amplifiers 432 and 434, which are coupled to respective coils 420, 422. The amplifiers 432 and 434 are operative to control electrical energy supplied to the respective coils 420 and 422 based on control signals from the processor 426. The encoder system 424 communicates its encoder data to the processor 426. The processor 426 determines an indication of the position and/or movement of the plunger based on encoder data, such as its position relative the z and Φ axes. The processor 426 utilizes the determined position and/or movement to determine appropriate controls for the amplifiers 432 and 434 according to the stored operating program. The amplifiers 432 and 434, in turn, control energization of each phase of the respective coils 420 and 422 based on the control signals from the processor 426 so as to effect desired movement of the plunger 410.

In accordance with an aspect of the present invention, the module 402 also may include one or more sensors 436 to monitor desired conditions associated with the module. For example, sensor(s) 436 could be employed to sense current through the coils 420 and 422 and/or of each phase of the coils. Sensors 436 also may be used to measure a temperature condition of the motor 408 and/or amplifier system 430. Other electrical characteristics may be monitored, such as the duty cycle of the signal applied to energize the coils and or the condition of limit switches 18 (FIG. 1A). Physical conditions associated with the module 402 also may be monitored by the sensors 436, including vibration of the rotary-linear motor, an amount of force (rotational and/or linear) provided by the plunger 410, and/or the condition of the vacuum or air pressure associated with providing the air bearing 76. Those skilled in the art will understand and appreciate other conditions useful in performing diagnostic functions that may be sensed by the sensors 436 as well as various ways in which such sensing could be implemented in the module 402 in accordance with the present invention.

The control system 406 includes a network interface 438 that connects the module 402 to the network 404 in accordance with an aspect of the present invention. As mentioned above with respect to FIG. 10, the network 404 may employ any suitable network protocol (wired or wireless) to communicate data between the module 402 and one or more computers 440, which may be connected to the network. The computer 440 may be a workstation, server, peer-to-peer device or other device that may receive and/or send information over the network 404.

By way of the illustration, the computer may be a server computer or otherwise connectable to a Wide Area Network (WAN) 442, such as the Internet or an intranet. The WAN 442 provides a gateway through which information may be sent to and/or from the module 402. That is, one or more remote computer systems 444 may receive information from the module 402 that identifies the operating characteristics of the module. The operating characteristics may include information sensed by the sensor(s) 436, the encoder(s) 424, and/or other operating information supplied by the processor 426. The information may be sent directly from the module 402 to the remote computer 444 directly through the network 404. Alternatively or additionally, the condition information may be collected at the local computer 440 for a period of time, and, in turn, packaged and transmitted to the remote computer 444 (e.g., periodically, upon request by the remote computer 444, etc.).

The remote computer 444 may be programmed and/or configured to store and evaluate the module condition data. For example, the remote computer 444 may be maintained by the manufacturer or distributor of the module 402 and be programmed to perform diagnostic and/or maintenance services based on the module condition data provided from the module 402. The remote computer 444 may include a library (e.g., a signal signature library) that characterizes various possible operating conditions of different parts of the module 402. The signature library, for example, may be collected over an extended period of time from numerous modules having various known operating characteristics. The remote computer 444 thus may compare the module condition data received from the module 402 with the library data and determine whether each sensed condition is within expected operating parameters. The library further may enable the computer 444 to diagnose error conditions, malfunctions, and/or degrading components based on the module condition data. By way of illustration, the computer 444 further may correlate data collected from the module 402 over a period of time (e.g., days, weeks, etc.) to help diagnose potential problems associated with its operation.

As a result of monitoring such data, the remote computer 444 may identify parts of the module that may require maintenance or recalibration as well as which components may be deteriorating and eventually require repair. A corresponding report may be printed to advise the owner of the module 402 or other person desiring information about its operating condition. In addition or alternatively, the remote computer 444 may send calibration and/or maintenance program data via the network 404 to the module 402 and/or to individual components of the module to adjust selected operating parameters in an effort to improve operation based on the analysis of the module condition data. For example, the remote computer may address a message to an IP address associated with the module 402, which may cause the message to be sent through the WAN, to the computer 440, and to the network interface 438 of the target module 402. The processor 426 may process the message and, in turn, adjust the program data stored in the memory 428. The adjusted program data further may be employed to recalibrate one or more components within the module 402, such as to improve their operating characteristics based on the remote analysis at the computer 444. In addition, an updated version of operating software may be provided to the module 402 via the network 404. In this way, the module 402 and its components may be recalibrated or tuned to operate in a more efficient and optimized manner.

In the event that maintenance of the module may be required, the remote computer 444 is programmed to identify with particularity which components should be replaced or repaired. A technician further may be provided a corresponding report identifying the component(s) in need of repair as well as identify a preferred procedure to implement such repair. As a result, the maintenance and repair of the module is greatly facilitated. Potential downtime of the module 402 and the system in which it operates also is mitigated.

While the module condition analysis has been described as being performed by a remote computer 444 that is coupled to the module via the WAN 442, it is to be understood and appreciated that some or all of such functionality could be performed that the computer 440 and/or at more than one remote computer.

By way of illustration, the module 402 is part of a larger interconnected system comprising several other modules 446 coupled to the network 404. Communication thus may occur between the module 402 and the other modules 446, so as to facilitate automation and cooperation between such modules. In addition, when one of the modules is determined to be operating outside of its expected operating parameters, the arrangement of the system 400 enables one or more other modules to be re-programmed or calibrated to compensate for inefficiencies and/or malfunctions associated with another of the modules.

In view of the foregoing arrangement shown and described with respect to FIGS. 10 and 11, those skilled in the art will understand and appreciate various other maintenance and control functionality that could be implemented in accordance with an aspect of the present invention.

Figure 12:
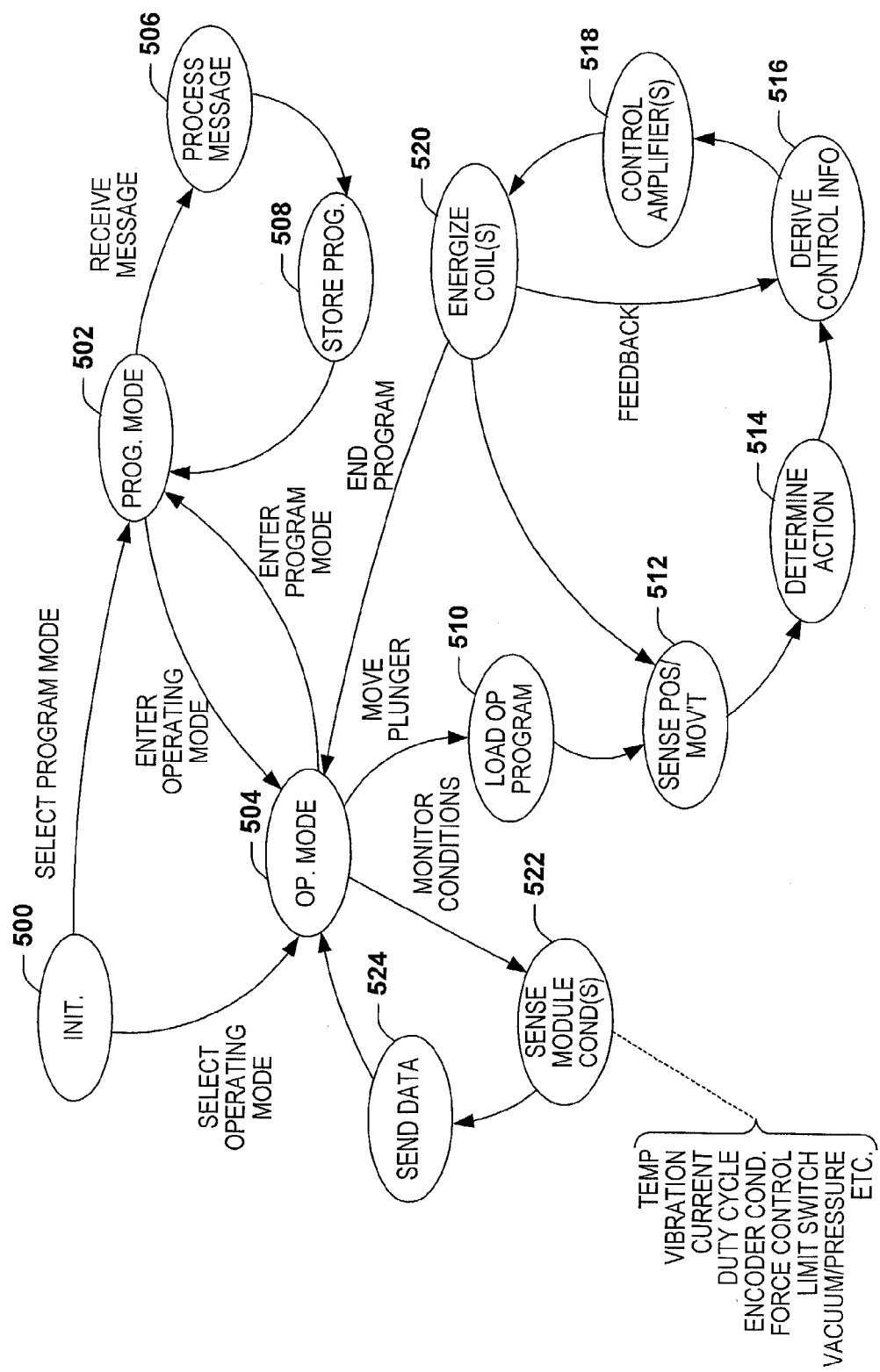
FIG. 12 is a state diagram illustrating an example of functionality that may be implemented in a rotary-linear actuator system in accordance with an aspect of the present invention.

In view of the foregoing structural and functional features described above, the functionality of an integrated motor and control module that may be implemented in accordance with the present invention will be better appreciated with reference to FIG. 12. While, for purposes of simplicity of explanation, the methodology of FIG. 12 is shown and described as a state diagram having serially executing portions, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodologies may be implemented as computer-executable instructions, such as software stored in a computer-readable medium or as hardware or as a combination of hardware and software.

The methodology begins at state 500 with initialization of the module, such as upon powering up the module and associated network. After initialization, the module may enter one of at least two modes, namely, a program mode 502 or an operating mode 504. While two such modes are shown in FIG. 12 for purposes of brevity, those skilled in the art will understand and appreciate other modes that could be implemented at the module in accordance with the present invention.

In the program mode (502), if a message is received, the module processes the received message (506). The message, for example, is sent over the associated network addressed to the module and/or to one or more components of the module. The processing of the message may include combining data from multiple data packets according to the network protocol being implemented. In addition, the data is analyzed to ascertain what action, if any should be performed. If the message(s) contain new program data for the module, the program data is stored (508) in appropriate memory of the module. For example, a new or updated version of the operating software may be transmitted to the module via the network. Additionally or alternatively, operating parameters may be adjusted or components calibrated to improve operating characteristics of the module. The module may remain in the programming mode until the programming mode is terminated.

The module may enter the program mode from the operating mode and may enter the operating mode from the program mode. It is also to be appreciated that the program mode could occur concurrently with the operating mode.

The operating mode (504) runs one or more operating programs stored in memory of the module. For example, if it is desired to move the plunger (e.g., about its Z and/or Φ axes), a selected operating program is loaded (510) into active memory. By way of illustration, the operating program may activate an encoder system to sense the position and/or movement of the plunger (512). The encoder data is provided to the processor, which determines an appropriate action (514) based on the instructions in its operating program for the sensed position or movement. The processor, in turn, derives control information (516) to effect the action determined at 514. The control information is utilized to control an associated amplifier system (518). For example, the amplifier system may include a pair of amplifiers, such as may include appropriate switching circuitry, to provide an amount of electrical energy to coils to implement desired movement (e.g., linear and/or rotary) of the plunger.

The amplifier system provides electrical current to energize the coils (520) so as to provide a desired electric field. The electric field interacts with magnets associated with the plunger to effect desired movement of the plunger, such as shown and described herein. The processor also may employ appropriate feedback to control of the amplifier system, such as based on the sensed current and/or force control. The processor may employ the feedback to adjust control parameters such that the amplifier provides electrical energy to the coils as a function of the feedback signal and other sensed operating conditions to achieve desired movement of the plunger. The loaded program may continue to execute (512–520) until terminated, such as may occur upon completion of a desired task and/or upon receiving an instruction (e.g., message received via the network, a user input device, and/or from an associated module in the networked system).

In the operating mode at 504, the module further may implement executable instructions to monitor one or more conditions of the module (522) and send an indication (524) of such data over the network via its network interface. By way of example, the module may be equipped with one or more sensors operative to sense different conditions of the module. Such sensors may provide signals to the processor based on the sensed conditions. For example, the module may include temperature sensors, vibration sensors, current sensors (e.g., for sensing current through the coils, the amplifier, and/or the individual phases of the coils), encoder condition sensors, limit switch condition sensors, sensors for monitoring the force being applied by the plunger (rotational and/or linear), sensors that monitor the vacuum or air pressure of the air bearing, etc. The processor may aggregate such data, and send the aggregated data over the network for analysis. The data may be sent from the module at regular intervals or upon request, such as provided in a message received at the module.

The data sent over the network may be evaluated at a remote or local computer to determine the health or status of the module and its components. For example, a determination may be made as to whether maintenance is needed and/or whether operating parameters at the module could benefit from adjustment. The evaluation may be based on a collection of module condition data sent over an extended period of time. For example, the data for the module (as well as for a plurality of such modules) may be aggregated into a table or other data structure and compared relative to a data library for the module. The comparison thus may provide an indication whether the module is operating within expected parameters and/or an indication of particular components that may be operating below expected levels, such as due to degradation or malfunctions.

Certain detected condition may be corrected by adjusting the operating characteristics of the module, such as by appropriately adjusting the operating parameters of the module and/or reprogramming the module. Accordingly, the message received in the program mode (502, 506) may be employed to adjust such operating parameters of the module and/or to provide new operating programs to control operation of the module.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An integrated rotary-linear actuator system, comprising:
    a plunger movable along and rotatable about a longitudinal axis extending through the plunger, the plunger is supported against a motor support via bearings, the plunger comprises an array of magnets arranged on one of an outside surface of the plunger and an inside surface of the motor support, which supports the plunger to permit movement thereof;
    a coil system having two sets of coils arranged to, when energized, interact with the plunger, the first set of coils embedded in a resin and being operative to provide an electric field to effect movement of the plunger in a linear mode, the second set of coils being operative to effect movement of the plunger in a rotational mode;
    an amplifier coupled to the coils and operative to provide electrical energy to energize the coils;
    a control system integrated with the amplifier, the control system having a network interface operative to receive control information, the control system being operative to control the amplifier to selectively energize the coils to effect desired movement of the plunger based on the control information received via the network interface, the control system and an associated rotary-linear motor are integrated into a single module;
    an encoder system coupled to the control system for determining the position of the plunger, the encoder system is affixed to a surface of the array of magnets and etched with a pattern of reflective and non-reflective regions that are scanned by optical pickups to register movement of the plunger, wherein the control system controls the amplifier and, in turn, controls energization of each phase of the coils based on the position information from the encoder system so as to effect desired movement of the plunger.

2. The system of claim 1, the first set of coils are arranged to apply an axial force on the array of magnets to drive the plunger in the linear mode and the second set of coils arranged to apply a tangential force on the array of magnets to drive the plunger in the rotational mode.

3. The system of claim 1, the motor support comprises a bearing support and a housing that define a well operative to receive the plunger, the plunger being supported by a bearing located between the plunger and the bearing support, such that the plunger is axially movable along the longitudinal axis between a retracted position and an extended position and rotatable about the longitudinal axis.

4. The system of claim 1, the amplifier further comprises first and second amplifiers, each being operative to provide electrical energy to a respective one of the first and second coils.

5. The system of claim 1 in combination with a network to which the network interface is coupled, the combination further comprising a computer operative to communicate the control information to the control system via the network interface using a network protocol.

6. The combination of claim 5, the control information includes program data to program operating characteristics of at least part of the integrated rotary-linear actuator system.

7. The combination of claim 5, the integrated rotary-linear actuator system further comprises at least one sensor operative to sense a condition of the integrated rotary-linear actuator system and provide a sensor signal indicative thereof, the control system being operative to communicate condition data based on the sensor signal to the computer via the network interface using the network protocol.

8. The combination of claim 7, the control information includes program data operative to program operating characteristics of at least part of the integrated rotary-linear actuator system based on evaluation of the condition data from the integrated rotary-linear actuator system.

9. A rotary-linear actuator system, comprising:
a motor support having a well;
a plunger supported for movement via bearings in at least part of the well so as to enable axial movement of the plunger relative to the well along a longitudinal axis of the plunger and rotational movement of the plunger about the longitudinal axis;
an array of permanent magnets associated with the plunger, half of the magnets are oriented such that their north poles point radially outward and the other half such that their north poles point radially inward, the array arranged as alternating columns of alternating polarity;
a first set of coils arranged to, when energized, apply an electric field that interacts with the array of magnets and provides an axial force to drive the plunger element in a linear mode;
a second set of coils arranged to, when energized, apply an electric field that interacts with the array of magnets and provides a tangential force to drive the plunger element in a rotational mode;
an integrated control system having a network interface operative to receive control information via an associated network, the control system comprising an amplifier coupled to the first and second sets of coils and being operative to selectively energize the first and second sets of coils to effect movement of the plunger in at least one of the linear and rotational modes, the integrated control system and an associated rotary-linear motor are integrated into a single module; and
an encoder system coupled to the integrated control system for determining the position of the plunger, the encoder system is affixed to a surface of the array of permanent magnets and etched with a pattern of reflective and non-reflective regions that are scanned by optical pickups to register movement of the plunger,
wherein the control system controls the amplifier and, in turn, controls energization of each phase of the first and second sets of coils based on the position information from the encoder system so as to effect desired movement of the plunger.

10. The system of claim 9, further comprising a computer operative to communicate the control information to the control system via the associated network using a network protocol.

11. The system of claim 10, the control information includes program data having executable instructions to program the control system to effect desired operating characteristics of the rotary-linear actuator system.

12. The system of claim 10, the rotary-linear actuator system further comprises at least one sensor operative to sense a condition of the rotary-linear actuator system and provide a sensor signal indicative thereof, the control system being operative to communicate condition data based on the sensor signal to the computer via the associated network using the network protocol.

13. The system of claim 12, the control information includes program data to program operating characteristics of at least part of the integrated rotary-linear actuator system based on evaluation of the condition data from the integrated rotary-linear actuator system.

14. An integrated rotary-linear actuator system, comprising:
means for supporting a plurality of motors including means for supporting a bearing, the means for supporting the plurality of motors and the means for supporting the bearing defining a well;
means for moving a stage and adapted to be received by the well, the means for moving the stage being axially movable along its longitudinal axis between retracted and extended conditions and rotatable about its longitudinal axis, the means for moving the stage being supported by a bearing located between the means for moving the stage and the means for supporting the bearing;
means for providing a magnetic field arranged on the means for moving the stage, the means for providing the magnetic field constructed as a mesh with alternating rows of polarity;
means for applying a substantially axial force on the means for providing the magnetic field and driving the means for moving the stage linearly, the means for applying a substantially axial force embedded in a resin;
means for applying a substantially tangential force on the means for providing the magnetic field for the means for moving the stage rotationally;
means for amplifying an electrical signal and providing the amplified signal to at least one of the means for applying;

control means for controlling the means for amplifying, the control means including means for interfacing with an associated network and receiving control information to program the control means to control the means for amplifying to selectively activate the means for applying, and transmitting diagnostic information to at least one computer associated with the network, the control means and an associated motor are integrated into a single module; and means for determining the position of the plunger, the means for determining the position of the plunger is affixed to a surface of the magnet field and etched with a pattern of reflective and non-reflective regions that are scanned by optical pickups to register movement of the means for supporting a plurality of motors.

15. A method for controlling an integrated rotary-linear actuator system, the rotary-linear actuator system including a control system and an associated rotary-linear motor integrated into one module, the control system including a network interface to enable communication over an associated network, the method comprising:

receiving control information at the network interface of the integrated rotary-linear actuator system via the associated network;

programming operating parameters of the rotary-linear actuator system based on the received control information;

controlling an amplifier to selectively energize two sets of coils of the rotary-linear actuator system according to the programmed operating parameters, such that a plunger, which is moveable linearly and rotationally about a longitudinal axis thereof, moves in at least one of a linear and rotational direction, the linear direction in response to the energization of a first set of coils, and the rotational direction in response to the energization of a second set of coils, the plunger comprises an array of magnets arranged on one of an outside surface of the plunger and an inside surface of a motor support, which supports the plunger to permit movement thereof;

determining the position of the plunger via an encoder system affixed to a surface of the array of magnets and etched with a pattern of reflective and non-reflective regions that are scanned by optical pickups to register movement of the plunger; and controlling energization of each phase of the two sets of coils based on the position information from the encoder system so as to effect desired movement of the plunger.

16. The method of claim 15, the control information is communicated from a remote computer via the network interface using a network protocol.

17. The method of claim 15, the control information includes program data, the operating parameters of the rotary-linear actuator system being programmed based on the program data.

18. The method of claim 16, further comprising:

sensing at least one condition of the integrated rotary-linear actuator system;

providing a sensor signal indicative of the sensed at least one condition; and sending condition data from the integrated rotary-linear actuator system to the computer via the network interface using the network protocol, the condition data being based on the sensor signal.

19. The method of claim 18, the control information includes program data to program the operating parameters of at least part of the integrated rotary-linear actuator system based on evaluation of the condition data sent from the integrated rotary-linear actuator system.

20. An integrated rotary-linear actuator system, comprising:

a plunger movable along and rotatable about a longitudinal axis extending through the plunger, wherein the plunger includes an inner and an outer cylindrical portion, both open at one end, with permanent magnets attached to the inner walls of the inner and outer cylindrical portions, the permanent magnets arranged in rows of alternating polarity;

air bearings supporting the plunger against an actuator support stage;

a coil system having coils arranged to, when energized, interact with the magnets attached to the plunger to move the plunger in a rotational mode and/or a linear mode;

an amplifier coupled to the coils to provide electric energy to the coils;

a control system and a network interface integrated into a single module, the control system integrated with a rotary-linear actuator, the network interface receiving and transmitting at least one of control and diagnostic information to an associated network; and an encoder system coupled to the control system for determining the position of the plunger integrated into a single module with the actuator, the encoder system is affixed to a surface of the permanent magnets and etched with a pattern of reflective and non-reflective regions that are scanned by optical pickups to register movement of the plunger, wherein the control system controls the amplifier and, in turn, controls energization of each phase of the coils based on the position information from the encoder system so as to effect desired movement of the plunger.

21. The system of claim 20, further comprising a computer to communicate control information to the control system via the associated network.

22. The system of claim 21, the computer retrieves diagnostic information related to the health of the actuator via the associated network.

23. The system of claim 21, the computer is connected to a remote computer over the Internet.

24. The system of claim 23, the remote computer is operable to send calibration and/or maintenance program data to the actuator system.

* * * * *